US012190913B2

(12) United States Patent
Yan et al.

(10) Patent No.: US 12,190,913 B2
(45) Date of Patent: Jan. 7, 2025

(54) METHOD AND APPARATUS FOR MULTIMEDIA RESOURCE EDITING SCENE, AND DEVICE AND STORAGE MEDIUM

(71) Applicant: Beijing Zitiao Network Technology Co., Ltd., Beijing (CN)

(72) Inventors: Ying Yan, Beijing (CN); Yingzhi Zhou, Beijing (CN); Ran Cui, Beijing (CN); Yize Cheng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/536,033

(22) Filed: Dec. 11, 2023

(65) Prior Publication Data

US 2024/0112701 A1  Apr. 4, 2024

Related U.S. Application Data

(63) Continuation of application No. PCT/CN2022/112915, filed on Aug. 17, 2022.

(30) Foreign Application Priority Data

Aug. 18, 2021 (CN) .......................... 202110950829.8

(51) Int. Cl.
  *G11B 27/031* (2006.01)
(52) U.S. Cl.
  CPC ................................. *G11B 27/031* (2013.01)
(58) Field of Classification Search
  CPC ................................................... G11B 27/031
  See application file for complete search history.

(56) References Cited

U.S. PATENT DOCUMENTS 11,114,087 B1 *  9/2021  Leslie ..................... G10L 15/20
2013/0042169 A1  2/2013  Reedy
(Continued)

FOREIGN PATENT DOCUMENTS

CN   1909621 A   2/2007
CN   102111913 A   6/2011
(Continued)

OTHER PUBLICATIONS

International Patent Application No. PCT/CN2022/112915; Int'l Search Report; dated Nov. 2, 2022; 2 pages.
(Continued)

*Primary Examiner* — Gelek W Topgyal
(74) *Attorney, Agent, or Firm* — BakerHostetler (57) ABSTRACT

Disclosed in the embodiments of the present disclosure are a method and apparatus for multimedia resource editing scene, and a device and a storage medium. The method comprises: detecting whether a current time matches a specified time; in response to determining that the current time matches the specified time, presenting prompt information of a target editing template; where the target editing template is associated with a first multimedia resource; content of the first multimedia resource belongs to a content category associated with the specified time; the target editing template instructs to edit a to-be-edited multimedia material into a second multimedia resource in a target editing way; the target editing way is an editing way used by the first multimedia resource; and the prompt information is presentation information of the first multimedia resource.

20 Claims, 5 Drawing Sheets

(56) References Cited

U.S. PATENT DOCUMENTS

| | | | |
|---|---|---|---|
| 2014/0157166 A1 | 6/2014 | Choi | |
| 2018/0176614 A1* | 6/2018 | Lin | G11B 27/031 |
| 2018/0348966 A1* | 12/2018 | Scoville | H04L 51/52 |
| 2019/0205929 A1* | 7/2019 | Snibbe | G06Q 30/0251 |
| 2020/0152237 A1* | 5/2020 | Chen | G11B 27/034 |
| 2023/0412723 A1* | 12/2023 | Xu | H04M 1/72403 |

FOREIGN PATENT DOCUMENTS

| | | | | |
|---|---|---|---|---|
| CN | 111105819 A | * | 5/2020 | G11B 27/031 |
| CN | 111243632 A | | 6/2020 | |
| CN | 111930994 A | | 11/2020 | |

OTHER PUBLICATIONS

Extended European Search Report for European Application No. 22857828.2, mailed Oct. 9, 2024, 10 pages.

First Office Action for Chinese Application No. 202110950829.8, mailed on Oct. 12, 2024, 17 pages.

\* cited by examiner

METHOD AND APPARATUS FOR MULTIMEDIA RESOURCE EDITING SCENE, AND DEVICE AND STORAGE MEDIUM

CROSS-REFERENCE TO RELATED APPLICATION(S)

This application is a Continuation Application of International Patent Application No. PCT/CN2022/112915, filed on Aug. 17, 2022, which claims priority to Chinese Application No. 202110950829.8 filed on Aug. 18, 2021, the disclosures of which are incorporated herein by reference in their entities.

FIELD

Embodiments of the present disclosure relate to the technical field of the Internet, e.g., relating to a method and apparatus for multimedia resource editing scene, and a device and a storage medium.

BACKGROUND

With the rapid development of terminal technology, many devices have the function of taking photos, facilitating users to record wonderful moments in their daily life by taking photos or videos. In order to achieve better visual effects, users often expect to edit multimedia materials such as photos or videos to get edited videos. Therefore, a variety of application programs that support the video editing function have emerged in such context.

At present, the functionality of video editing applications is rather limited, cannot meet the diversified creative needs of users and thus needs to be improved.

SUMMARY

Embodiments of the present disclosure provide a method and apparatus for multimedia resource editing scene, and a storage medium and a device, which can improve the solution for multimedia resource editing scene in the related art.

In a first aspect, an embodiment of the present disclosure provides a method for multimedia resource editing scene, including: detecting whether a current time matches a specified time; presenting prompt information of a target editing template in response to determining that the current time matches the specified time; where the target editing template is associated with a first multimedia resource; content of the first multimedia resource belongs to a content category associated with the specified time; the target editing template instructs to edit a to-be-edited multimedia material into a second multimedia resource in a target editing way; the target editing way is an editing way used by the first multimedia resource; and the prompt information is presentation information of the first multimedia resource.

In a second aspect, an embodiment of the present disclosure provides an apparatus for multimedia resource editing scene, including: a detecting module, configured to detect whether a current time matches a specified time; a prompt information presenting module, configured to present prompt information of a target editing template in response to determining that the current time matches the specified time; where the target editing template is associated with a first multimedia resource; content of the first multimedia resource belongs to a content category associated with the specified time; the target editing template instructs to edit a to-be-edited multimedia material into a second multimedia resource in a target editing way; the target editing way is an editing way used by the first multimedia resource; and the prompt information is presentation information of the first multimedia resource.

In a third aspect, an embodiment of the present disclosure provides a computer readable storage medium, storing a computer program thereon, the program, when executed by a processor, performing the method for multimedia resource editing scene as provided by an embodiment of the present disclosure.

In a fourth aspect, an embodiment of the present disclosure provides an electronic device, comprising a memory, a processor and a computer program stored on the memory and runnable on the processor, the processor, when executing the computer program, performing the method for multimedia resource editing scene as provided by an embodiment of the present disclosure.

In a fifth aspect, an embodiment of the present disclosure provides a computer program product, comprising a computer program stored on a non-transient computer readable storage medium, the computer program comprising program instructions which, when executed by a computer, perform the method for multimedia resource editing scene as provided by an embodiment of the present disclosure.

DETAILED DESCRIPTION OF EMBODIMENTS

Embodiments of the present disclosure will be described in more detail with reference to the accompanying drawings, in which some embodiments of the present disclosure have been illustrated. However, it should be understood that the present disclosure can be implemented in various ways, and thus should not be construed to be limited to embodiments disclosed herein. On the contrary, these embodiments are provided for the thorough and complete understanding of the present disclosure. It should be understood that the drawings and embodiments of the present disclosure are merely for the illustration propose and not limiting the protection scope of the present disclosure.

It should be understood that various steps described in method embodiments of the present disclosure may be performed in a different order and/or in parallel. In addition, the method embodiments may comprise an additional step and/or omit a step which is shown. The scope of the present disclosure is not limited in this regard.

The term "comprise" and its variants used here are to be read as open terms that mean "include, but is not limited to". The term "based on" is to be read as "based at least in part on". The term "one embodiment" are to be read as "at least one embodiment". The term "another embodiment" is to be read as "at least one other embodiment". The term "some embodiments" are to be read as "at least some embodiments". Other definitions will be presented in the description below.

Note that the concepts "first", "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more".

Names of messages or information interacted between multiple apparatuses in the implementation of the present disclosure are merely for the illustration purpose, rather than limiting the scope of these messages or information.

In the following multiple embodiments, each of the embodiments provides both example features and examples. Multiple features described in the embodiments may be combined to form multiple example solutions, and each numbered embodiment should not be considered as only one technical solution.

Figure 1:
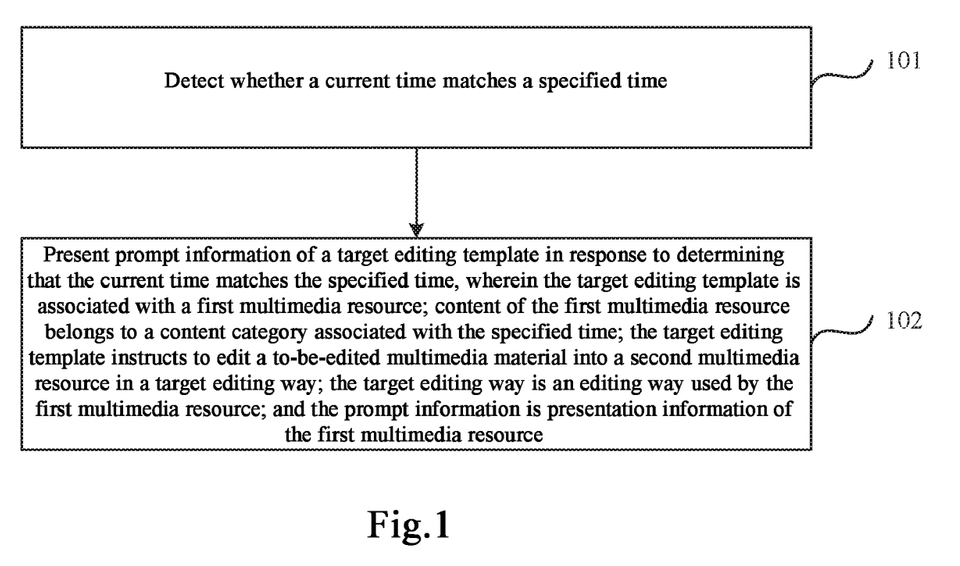
FIG. 1 is a schematic flowchart of a method for multimedia resource editing scene provided by an embodiment of the present disclosure.

FIG. 1 is schematic flowchart of a method for multimedia resource editing scene provided by an embodiment of the present disclosure. The method may be performed by an apparatus for multimedia resource editing scene, where the apparatus may be implemented as software and/or hardware and usually integrated in an electronic device. The electronic device may be a mobile device such as a mobile phone, a smart watch, a tablet computer and a personal digital assistant; it may also be other device such as a desktop computer. The method for multimedia resource editing scene provided by an embodiment of the present disclosure may be applicable to a scenario of pushing an editing template. As shown in FIG. 1, the method comprises the following:

Step 101: whether a current time matches a specified time is detected.

As an example, the method for multimedia resource editing scene may be applied to a predefined application program, which may be, for example, an application program with the editing function and installed in an electronic device. The editing function may be understood as a function of performing processing operations such as selecting, cropping, splicing or arranging multimedia materials to obtain multimedia resources such as edited videos. For reasons such as reducing the difficulty of editing and increasing the efficiency of editing, predefined applications can provide editing templates to the user. In consideration of reducing the editing difficulty and increasing the editing efficiency, the predefined application program may provide an editing template to a user. The editing template is used to edit multimedia materials to obtain multimedia resources (for the sake of illustration, edited videos are taken as an example below) such as edited videos, which may be referred to as a template. The editing template may contain an editing way and instruct the to-be-edited multimedia material to be edited into a multimedia resource in the editing way in the editing template. That is, the edited video resulting from editing with the editing template may match the editing way in the editing template, achieving the "same style editing" effects. The multimedia material may comprise, for example, a picture, video or audio, etc. The multimedia material may comprise a material obtained under the user's current operation such as filming, may include a material locally stored in the electronic device, and may include a material obtained through network downloading, etc. Taking a picture as an example, the multimedia material may comprise a photo currently captured by the user, and may further comprise a captured photo or other type of picture stored in a local album of the electronic device, or may comprise a picture downloaded from the network, etc. The editing template provided by the predefined application program may comprise an editing template designed by developers or an editing template created by a user and uploaded to the server side corresponding to the predefined application program. The specific source is not limited here.

In the embodiment of the present disclosure, the specified time may be a user-specified time or a time automatically set by the predefined application program, may be a specific time or a date, e.g., a periodic date. The periodic date may be understood as a cyclically repeating date that will be reached after every fixed period. As an example, the specified time may include or be based on an anniversary. The anniversary may be understood as an important day to be remembered. For example, the user may set days of special significance to themselves as anniversaries, such as birthdays, couple or husband-and-wife related anniversaries (e.g., wedding anniversaries, etc.), baby-related anniversaries (e.g., baby's growth anniversaries, etc.), study-related anniversaries (e.g., graduation anniversaries), and work-related anniversaries (e.g., employment anniversaries, etc.). For another example, the predefined application program may automatically set days of special significance to a user group to which the user belongs as anniversaries (or automatically ask the user whether he/she needs to set the anniversary). For example, if the user is female, the Women's Day may be set; if the user is a user of a certain country, the country's holidays, such as the Chinese New Year and so on may be set. For another example, the predefined application may, with the user's consent, obtain information about the user's historical operations in the predefined application, such as the time of posting the edited video, the textual information added when posting the edited video, and the image content in the edited video, etc., predict alternative anniversaries based on the historical operation information, and ask the user whether to set the alternative anniversary to a specified time.

As an example, for anniversaries, the corresponding specified time may usually be determined according to certain rules. The specified time in a form of date is taken as example for illustration. For a birthday, assuming that the birthday is January 1, then January 1 of each year is the specified time corresponding to that birthday; taking a baby's 100th day as an example, assuming that the baby's date of birth is January 1, the date 99 days after January 1 is the specified time corresponding to the baby's 100th day; taking the graduation countdown as an example, assuming that the graduation date of the university is June 30, then June 30 may be directly determined as the specified time corresponding to the graduation countdown. In addition, the exact specified time may also be determined based on the date of the anniversary, e.g., 22:00 p.m. on the day before the anniversary, 8:00 a.m. on the day of the anniversary, etc.

Step 102: in response to determining that the current time matches the specified time, prompt information of a target editing template is displayed, where the target editing template is associated with a first multimedia resource; content of the first multimedia resource belongs to a content category associated with the specified time; the target editing template instructs to edit the to-be-edited multimedia material into a second multimedia resource in a target editing way; the target editing way is an editing way used by the first multimedia resource; and the prompt information is display information of the first multimedia resource.

As an example, a decision condition for determining whether the current time matches the specified time may be set in advance, and the decision condition may be determined based on a relationship (e.g., time interval) between the current time and the specified time. For example, the current time is the specified time, or the current time is close to the specified time, etc.

In the embodiment of the present disclosure, the prompt information of the target editing template may be displayed in a predefined page. A specific page type of the predefined page is not limited here, but an existing page in the predefined application may be reused, or a new page may be added.

As an example, the target editing template corresponds to the target editing way, the first multimedia resource is obtained from editing according to the target editing way, and the first multimedia resource may be understood as an example multimedia resource that conforms to the editing effects of the target editing template. When the target editing template is a video editing template, the first multimedia resource may be a corresponding example video. When the editing template is recommended to the user, display information of the example multimedia resource may be displayed, such as a cover image, video screenshots, or dynamically played video clips.

As an example, the specified time may be associated with a content category, which may be determined according to the type or characteristic of the specified time, such as birthday categories, wedding anniversary categories, and baby growth anniversary categories, etc. Content of the multimedia resource may reflect creation ideas, which might involve subjective, psychological and emotional connotations felt by the user from the multimedia resource and may be characterized by specified dimensions, including, e.g., text, images or sound. For example, the content of the multimedia resource may include literal meaning, background image content or background music, and so on. For example, if the background image of the first multimedia resource contains "Happy Birthday" or a birthday cake pattern, the content of the first multimedia resource may be considered as belonging to the category of birthday; for another example, if the background music of the first multimedia resource is the Happy Birthday song, then the content of the first multimedia resource may be considered as belonging to the category of birthday.

As an example, a template library corresponding to the specified time may be maintained in the predefined application or on the server side corresponding to the predefined application. When there are multiple specified times, the specified times may be in one-to-one corresponding relationship, one-to-many, many-to-one, or many-to-many relationship, and so on with the template library. When the prompt information of the target editing template needs to be displayed, the target editing template may be filtered out from the template library corresponding to the current specified time according to a predefined template filtering rule.

As an example, prompt information of a predefined number of target editing templates may be displayed in the predefined page, thereby facilitating the user to select a satisfactory editing template, where the predefined number may be set according to actual demands. A specific display way is not limited. The prompt information of the predefined number of target editing templates may be displayed at once, or displayed in batches and the users may switch by himself, e.g., by sliding and other operations to view prompt information of more target editing templates.

As an example, after the prompt information of the target editing template is displayed, related operations on the prompt information of the target editing template may be received from the user, such as selecting, viewing details, editing using the target editing template and processing the edited video (e.g., saving or reposting), etc.

The solution for multimedia resource editing scene provided in the embodiments of the present disclosure detects whether a current time matches a specified time, and in response to determining that the current time matches the specified time, displays prompts information of a target editing template, where the target editing template is associated with a first multimedia resource, content of the first multimedia resource belongs to a content category associated with the specified time, the target editing template indicates to edit a to-be-edited multimedia material into a second multimedia resource in a target editing way, the target editing way is an editing way used by the first multimedia resource, and the prompt information is display information of the first multimedia resource. By means of the technical solution, when the current time matches the specified time, an editing template in the category corresponding to the specified time is recommended to the user, so that the user may be reminded to edit a video by using the related editing template at the specified time. Therefore, the interaction effects and the fun of video editing may be increased, the utilization efficiency of the editing template may be increased, the user activity level may be promoted, the traffic efficiency of application programs may be improved, and further the utilization efficiency of related resources such as the corresponding platform or server may be enhanced.

In some embodiment, the in response to determining that the current time matches the specified time comprises: determining a remaining time length for the current time to reach the specified time; and in response to determining that the remaining length of time is less than a first predefined time length threshold, determining that the current time matches the specified time. In this way, the user may be reminded in advance by displaying the prompt information of the editing template, so that the user may get prepared for the specified time, that is, selecting a satisfactory editing template in advance, preparing for the multimedia material related to the specified time or preparing for the corresponding multimedia material according to the selected editing template. The first predefined time length threshold may be set according to actual needs, e.g., 1 day. In addition, when the remaining time length is 0, the user may be reminded on the day when the specified time reaches, in a way of displaying the prompt information of the editing template, so that the user may select a satisfactory editing template and edit a video according to the selected template.

In some embodiment, the displaying the prompt information of the target editing template comprises: displaying a first template display portal corresponding to the specified time; receiving a first triggering operation on the first template display portal; and in response to the first triggering operation, entering a predefined editing template page and displaying prompt information of a first predefined number of first target editing templates. Thus, a predefined editing template page may be added, i.e., at this point the predefined page is the predefined editing template page in which the prompt information of the first editing template corresponding to the specified time is displayed separately, to reduce the distraction from other content to the user. In addition, by adding the template display portal to remind the user to enter the predefined editing template page, the user may conveniently select the timing of entering the predefined editing template page while the reminder function is taken into account.

As an example, while displaying the prompt information of the target editing template corresponding to the specified time that matches the current time (referred to as a target specified time), the predefined editing template page may further display prompt information of an editing template corresponding to a specified time other than the target specified time, or depending on the page layout and other practical settings, display prompt information in descending order by time lengths for corresponding specified times to reach.

As an example, a display page to which the first template display portal belongs is not limited, e.g., may include at least one of a template editing function homepage, a template export page, an edited video processing page, a template search results page and a template details page. Thus, it is convenient for the user to view the first template display portal in the above page in time, and the reminder effect is enhanced. Among them, the template editing function homepage may be the first page (e.g., "same style editing" page) displayed after the template editing function is entered in the predefined application program; the template export page may be a page of template exporting or sharing; the edited video processing page may comprise a page of processing the edited video, including saving, modifying or sharing; the template search results page may comprise a page of displaying template search results after the user searches for template using keywords and other search methods; the template details page may comprise a page of displaying displays template details or plays a template after the user selects the template. When at least two of these pages are included, the probability that the user views the first template display portal in time without switching pages when the current time matches the specified time may be further increased, and the reminder effect of viewing editing templates may be further enhanced. For example, a display time length or disappearing timing of the first template display portal in the display page to which it belongs may be set in advance, and the first template display portal is controlled to stop displaying in the display page according to the predefined display time length or predefined disappearing timing. Thus, the first template display portal can be prevented from long-term display and causing interference to the user; moreover, the utilization efficiency of display space in the display page can be improved. It is not intended to limit how and where the first template display portal is displayed in the display page. The first triggering operation may be, for example, clicking, long-pressing, sliding, etc. Of course, the above display page may further comprise other type of page. For example, when it is detected that the current time matches the specified time, an inbound message is sent to the user, and the first template display portal is displayed in the inbound message details page.

In some embodiments, the method further comprises: in response to determining that the remaining time length is less than the first predefined time length threshold and greater than or equal to a second predefined time length threshold, displaying first reminder information at the first template display portal, the first reminder information used to remind the user to at least one of: check the remaining time length, and perform a multimedia material obtaining operation with respect to the specified time. Thus, the user may be reminded in advance by displaying the reminder information, making it convenient for the user to know the remaining time length, get prepared for the incoming specified time and perform a corresponding obtaining operation according to an obtaining way of multimedia materials, such as capturing photos or videos related to the specified time. The first reminder information may be text and/or a pattern, which may comprise a name of the specified time, a legend of the specified time, remaining days, e.g., "1 day before XX's birthday," and may further comprise other textual information, e.g., "pick out a birthday template first."

For example, after displaying the first reminder information at the first template display portal, in response to determining that the user wants to view the related template, the first triggering operation may be inputted into the first template display portal, and after the predefined editing template page is entered, a certain target editing template may be selected. Generally, the number of multimedia materials needed by the editing template is definite. When the user selects a target editing template, it may be considered that the user wants to use the target editing template to produce an edited video corresponding to the specified time. Therefore, it is necessary to prepare a number of multimedia materials matching the selected target editing template. For example, the selected target editing template comprises 6 material segments, each of which needs to be filled with photos or videos. Therefore, the user may purposefully prepare relevant materials before the specified time arrives, such as capturing relevant photos, etc. In order to better assist the user in the preparation of materials, support may be provided to the user to independently manage prepared materials. For example, a target material library corresponding to the selected target editing template may be built, the target material library containing a predefined number of material locations, the predefined number being consistent with the number of materials contained in the target editing template; materials imported by the user into the target material library are received and filled in the material locations; when no empty material location is detected, it is prompted that the preparation of materials is ready.

In some embodiments, the method further comprises: in response to determining that the remaining time length is less than the second predefined time length threshold, displaying second reminder information at the first template display portal, the second reminder information used to remind the user of the arrival of the specified time and/or remind the user to perform an editing operation by using an editing template with respect to the specified time. Such a setting may remind the user by displaying the reminder information when the specified time arrives, making it convenient for the user to select a satisfactory editing template and edit a video according to the selected template. The second reminder information may be text and/or a pattern, may comprise a name of the specified time or a legend of the specified time, e.g., "it is XX birthday today," and may further comprise other textual information, e.g., "edit a memory video now."

In some embodiments, the in response to the first triggering operation, entering a predefined editing template page and displaying prompt information of a first predefined number of first target editing templates in the predefined editing template page comprises: in response to the first triggering operation, filtering out a first predefined number of first target editing templates from a first template library corresponding to the specified time by using a first template filtering rule corresponding to the specified time; and entering a predefined editing template page and displaying prompt information of the first target editing template in the predefined editing template page. By filtering editing templates from the corresponding template library according to the filtering rule, it is possible to increase the template pushing efficiency and accuracy.

For example, the first template filtering rule is determined according to at least one of a predefined keyword, a predefined template tag, a predefined template category and template heat. Thus, the editing template to be displayed may be filtered out quickly and accurately. As an example, a predefined keyword corresponding to the specified time may be defined in advance, the predefined keyword is looked up in the template title or template description of each editing template in the first template library, and in response to determining that the template title or template description of an editing template contains the predefined keyword, the corresponding editing template may be determined as a candidate template. A predefined template tag corresponding to the specified time may be defined in advance, it is determined whether the template tag of each editing template in the first template library is same as the predefined template tag, and based on a determination result that the template tag of a certain editing template in the first template library is same as the predefined template tag, the editing template may be determined as a candidate template. A predefined template category corresponding to the specified time may be defined in advance, it is determined whether the template category of each editing template in the first template library is same as the predefined template category, and based on a determination result that the template category of a certain editing template in the first template library is same as the predefined template category, the editing template may be determined as a candidate template. In order to further increase the filtering accuracy, templates that meet all the requirements of the predefined keyword, the predefined template tag and the predefined template category may be determined as candidate templates. When the template heat factor is not taken into account, the first editing template may be selected directly from these candidate templates, e.g., at random. When considering the template heat factor, a first predetermined number of editing templates or candidate templates with higher heat in the first template library may be determined as the first target editing templates. The template heat may be determined according to relevant statistical data of an editing template in the predefined application program, such as the number of times it has been played, used or likes during a given period.

In some embodiments, the method further comprises: in response to determining that the current time does not match the specified time, receiving a second triggering operation on a second template display portal corresponding to the first specified time; in response to the second triggering operation, filtering out a second predefined number of second target editing templates from a second template library corresponding to the specified time by using a second template filtering rule corresponding to the specified time, where the second template filtering rule is different from the first template filtering rule; entering the predefined editing template page, and displaying prompt information of the second target editing template in the predefined editing template page. Thus, the second template display portal may be provided, making it convenient for users to check prompt information of relevant editing templates of the specified time during their daily use of the predefined application program. Since the second template filtering rule is different from the first template filtering rule, for the same specified time, users may view prompt information of different editing templates at different stages, thereby improving the richness of pushing editing templates and expanding the range of options for users. For example, the second template filtering rule may also be determined according to at least one of: a predefined keyword, a predefined template tag, a predefined template category, and template heat. For example, the first template filtering rule is determined according to a first predefined keyword, and the second template filter rule is determined according to a second predefined keyword, the first predefined keyword being different from the second predefined keyword. Other factors are similar, which is not detailed here. The display page to which the second template display portal belongs may be same as or different from that to which the first template display portal belongs. For example, the second template display portal may be used as a regularized portal on pages such as personal home pages.

In some embodiments, the displaying prompt information of a target editing template comprises: in a template recommendation stream display page, displaying prompt information for a third target editing template, and displaying an identification of the specified time at the prompt information for the third target editing template. Prompt information for an editing template may be recommended to users in the form of information stream in the template recommendation stream display page in the predefined application program, making it convenient for the user to browse and seek editing inspiration; the template recommendation stream display page may be reused to display to the user the third target editing template that matches the specified time, and an identification of the specified time may be displayed at a corresponding portal, thereby realizing a reminder for the specified time. The display way of prompt information for the third target editing template may be differentiated to make it easier for the user to quickly locate the third target editing template. As an example, the prompt information for the third target editing template is displayed in a first predefined display way, and the prompt information for the first editing template is displayed in a second predefined display way, the first predefined display way being different from the second predefined display way, the first editing template comprising an editing template other than the third target editing template in the template recommendation stream display page. The first predefined display way may be, for example, sticky on top, adding a highlighted border, and changing the color or font of the template name, etc. The third target editing template may be obtained in the same manner as the first target editing template, which is not described herein. The third target editing template may be obtained in a different manner than the first target editing template, but the original push policy of the template recommendation stream is retained, and on the basis of the original recommendation queue, templates that match the specified time in the top order (e.g., templates where the content of associated multimedia resources occurring for the first time belongs to the content category associated with the specified time) are filtered out as the third target editing templates.

In some embodiments, the method may further comprise: displaying a specified time management portal; in response to a third triggering operation to the specified time management portal, entering a specified time management page; in response to a specified time setting operation inputted through the specified time management page, generating and/or modifying a corresponding specified time. Thus, it is convenient for users to create or modify a specified time in a personalized way according to their actual situation. For example, in a case where the user has not created a specified time, if a predefined display event is detected as being triggered, then the specified time management portal is displayed in a predefined page. At this point, the display location of an anniversary management portal may be same as the first template display portal.

In some embodiments, the display page to which the specified time management portal belongs comprises at least one of a template editing function homepage, a template export page, an editing video processing page, a template search results page and a template details page.

For example, the displaying a specified time management portal comprises: displaying the specified time management portal in response to determining that a current page is the display page to which the specified time management portal belongs and an editing template corresponding to the current page matches a specified time. Thus, the specified time management portal may be displayed at an appropriate timing. For example, the specified time management portal may also be refined according to functions, i.e., may comprise a specified time creating portal and a specified time modifying portal. For users who have not created the specified time or need to remind users to add the specified time template recommendation function, the specified time creating portal may be displayed; in response to determining that the user has created the specified time, the specified time modifying portal may be displayed.

As an example, the above specified time may be any specified time or a specified time which is designated in advance in the predefined application program, which is not limited herein. When determining whether the editing template matches the specified time, the determination may be made in accordance with a predefined matching rule, which may be determined based on at least one of a predefined keyword, a predefined template tag, and a predefined template category.

As an example, for the template editing function homepage, where the editing template matching the specified time is displayed in the template editing function homepage, the specified time management portal may be displayed. For the template export page, where the currently exported or shared editing template matches the specified time, the specified time management portal may be displayed. For the edited video processing page, when the editing template processed currently matches the specified time, the specified time management portal may be displayed. For the template search results page, when the editing template matching the specified time is displayed in search results, the specified time management portal may be displayed. In addition, when search text inputted by the user contains the predefined keyword, the specified time management portal may also be displayed. For the template details page, in response to that the editing template played currently matches the specified time, the specified time management portal may be displayed. In addition, the determination of other conditions may be further added. For example, after the editing template played currently matches the specified time and the playback progress reaches a predefined progress threshold (e.g., the played duration reaches 60% of the total duration), the specified time management portal may be displayed. The editing template matching the specified time may be understood as the content of multimedia resources associated with the editing template belonging to the content category associated with the specified time.

In some embodiments, the method further comprises: displaying an editing library page corresponding to a specified time, where the editing library page comprises an edited video obtained by being edited with an editing template corresponding to the specified time and/or a multimedia material corresponding to the specified time. Thus, the edited video or multimedia material may be categorized and stored in a centralized way in the dimension of the specified time, enriching storage ways and improving the efficiency of users to find related edited videos or multimedia materials.

Figure 2:
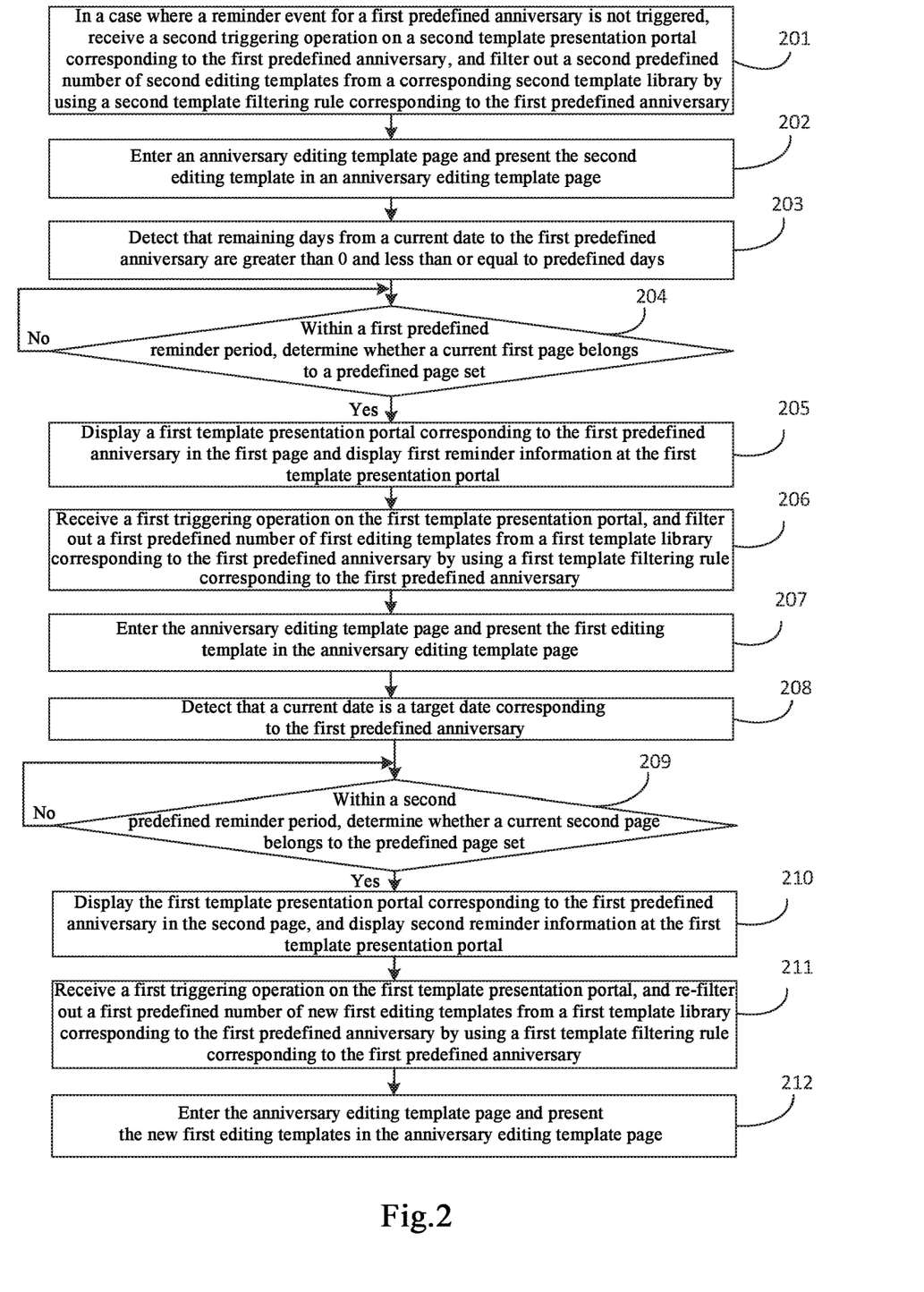
FIG. 2 is a schematic flowchart of a further method for multimedia resource editing scene provided by an embodiment of the present disclosure.

FIG. 2 is a schematic flowchart of another method for multimedia resource editing scene provided by an embodiment of the present disclosure. This embodiment is refined on the basis of multiple example solutions in the above embodiments, where a predetermined anniversary is taken as an example of the specified time and displaying prompt information of an editing template is described as displaying the editing template for the sake of illustration. For example, the method comprises the following:

S201: in a case where a reminder event for a first predefined anniversary is not triggered, a second triggering operation to a second template display portal corresponding to the first predefined anniversary is received, and a second predefined number of second editing templates from a corresponding second template library is filtered out by using a second template filtering rule corresponding to the first predefined anniversary.

As an example, in a case where a specified time is the predefined anniversary, the step of detecting whether a current time matches the specified time may be regarded as a reminder event for the predefined anniversary; in response to determining that the current time matches the specified time, it may be considered that the reminder event is triggered; in response to determining that the current time does not match the specified time, it may be considered that the reminder event is not triggered.

Figure 3:
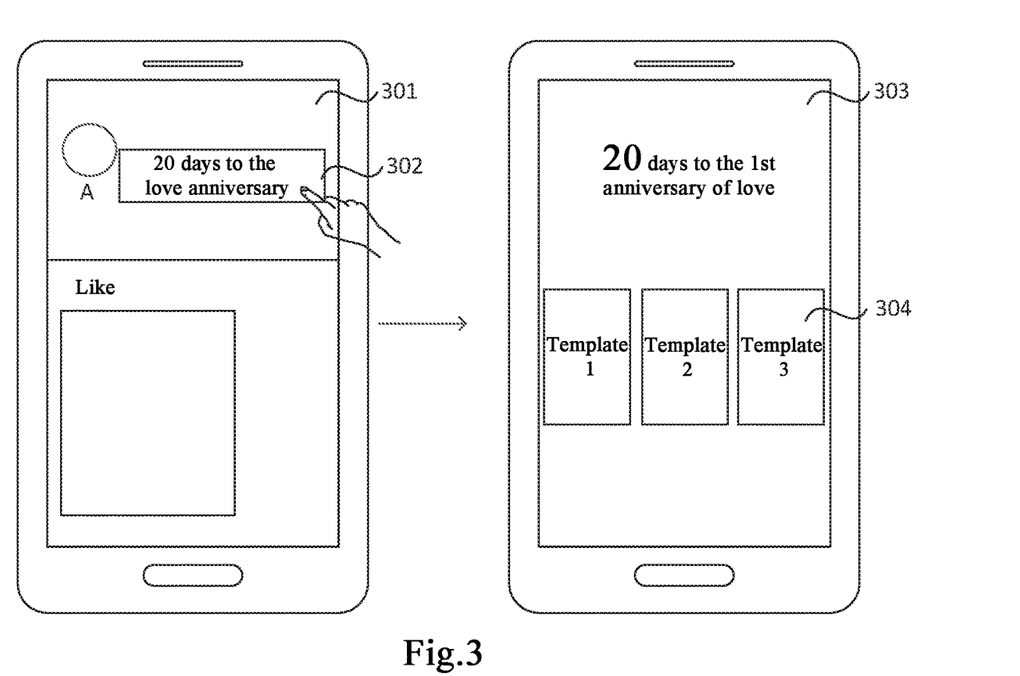
FIG. 3 is a schematic view of page interaction provided by an embodiment of the present disclosure.

For example, the second template display portal is displayed in a user personal homepage. Suppose the first predefined anniversary is a love anniversary. FIG. 3 is a schematic view of page interaction provided by an embodiment of the present disclosure. As depicted, a second template display portal 302 is displayed in a personal homepage 301. The second template display portal may be understood as a normalized portal for entering an anniversary editing template page, and users may choose whether to trigger or not according to their actual needs.

The second template filtering rule may be determined according to at least one of: a predefined keyword, a predefined template tag, a predefined template category, and template heat, and may be different from a first template filtering rule to be described below. Still take the love anniversary as an example. The predefined keyword may comprise couple, love, together, show affection, etc., the predefined template tag may comprise couple, the predefined template category may comprise couple, and the template heat may be top 20 among heat rankings.

Step 202: an anniversary editing template page is entered, and a second editing template in the anniversary editing template page is displayed.

The anniversary editing template page may be understood as the above predefined editing template page. As shown in FIG. 3, after the user clicks on the second template display portal 302, an anniversary editing template page 303 may be entered, and 3 second editing templates 304, i.e., template 1, template 2 and template 3 are displayed in the anniversary editing template page 303, that is, prompt information of template 1, prompt information of template 2 and prompt information of template 3 is displayed. In addition, the anniversary editing template page 303 may further comprise other relevant information of the first predefined anniversary, such as a specific category of the love anniversary, e.g., 1s t anniversary of love in the figure, and remaining days before until a target date, 20 days.

Step 203: it is detected that remaining days from a current date to a target date corresponding to the first predefined anniversary are greater than 0 and less than or equal to predefined days.

As an example, the predefined days may be 1 day, that is, the reminder is performed 1 day before the first predefined anniversary. For example, the predefined days are 2, and then the reminder is performed 2 days and 1 day earlier respectively.

Step 204: within a first predefined reminder period, it is determined whether a current first page belongs to a predefined page set, and step 205 is proceeded to based on a determination result that the current first page belongs to the predefined page set, or step 204 is repeated based on a determination result that the current first page does not belong to the predefined page set.

As an example, the predefined page set comprises a template editing function homepage, a template export page, an edited video processing page, a template search results page and a template details page. The first predefined reminder period may be one or more, that is, the user may be reminded in a certain or more periods of time on the day. For example, the first predefined reminder period may be from 8 am to 10 am and from 20 pm to 22 pm. After entering the first predefined reminder period, first it may be determined whether the current first page is a page that supports displaying the first template display portal. Based on a determination result that the current first page is a page that supports displaying the first template display portal, step 205 may be performed, i.e., the first template display portal is displayed. Based on a determination result that the current first page is not a page that supports displaying the first template display portal, the first template display portal may not be displayed for the moment. The determination continues, and in response to determining that the first predefined reminder period has ended, the determination may stop, and other relevant steps may be performed.

Step 205: the first template display portal corresponding to the first predefined anniversary is displayed in the first page, and first reminder information is displayed at the first template display portal.

The first reminder information may be used to remind the user to check remaining days and remind the user to obtain multimedia materials with respect to the predefined anniversary.

Figure 4:
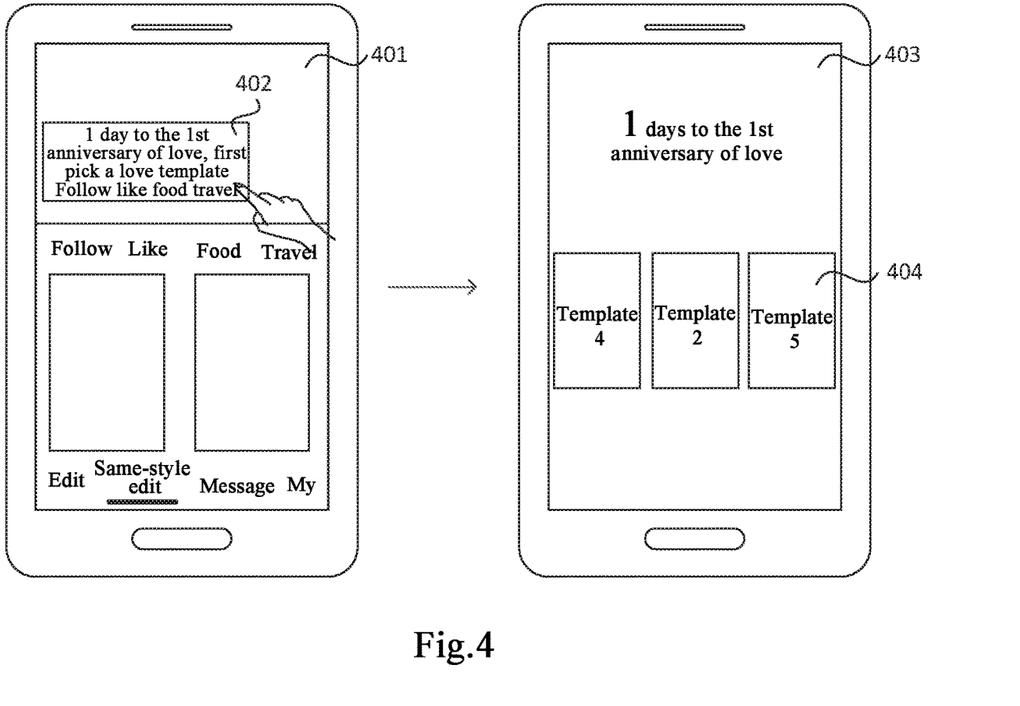
FIG. 4 is a schematic view of page interaction provided by an embodiment of the present disclosure.

FIG. 4 is a schematic view of page interaction provided by an embodiment of the present disclosure. Suppose the first page is a "same style editing" homepage 401, in which a first template display portal 402 is displayed and the first reminder information "1 day before $1^{st}$ anniversary of love" and "first select a love template" is displayed.

Step 206: a first triggering operation on the first template display portal is received, and a first predefined number of first editing templates from a first template library corresponding to the first predefined anniversary is filtered out by using a first template filtering rule corresponding to the first predefined anniversary. The first template filtering rule is determined according to at least one of: a predefined keyword, a predefined template tag, a predefined template category and template heat. Still take the love anniversary as an example. The predefined keyword may comprise XX day, XX month or X year, etc., the predefined template tag may comprise couple, the predefined template category may comprise couple, and the template heat may be top 10 among heat rankings. The first template library and the second template library may be either same or different, or may include some duplicated templates.

Step 207: the anniversary editing template page is entered, and the first editing template is displayed in the anniversary editing template page.

As shown in FIG. 4, after the user clicks on the first template display portal 402, an anniversary editing template page 403 may be entered, and 3 first editing templates 404, i.e., template 4, template 2 and template 5 are displayed in the anniversary editing template page 403. It can be seen that the first editing template 404 and the second editing template 304 might be either same or different. At this point, the anniversary editing template page 403 may further comprise other relevant information of the first predefined anniversary, such as a specific category of the love anniversary, e.g., $1^{st}$ anniversary in the figure, and remaining days before until a target date, 1 day.

For example, after displaying the first editing template, related steps might further be comprised, such as selecting an editing template according to the user operation or displaying details of the editing template.

It is noteworthy that in response to determining that the user once entered the anniversary editing template page during the first predefined reminder period or the user has not yet entered the anniversary editing template page after the first predefined reminder period expires, the first template display portal may stop displaying, so as to avoid interference to the user.

Step 208: it is detected that a current date is a target date corresponding to the first predefined anniversary.

As an example, it is detected that the current date is the day of the 1s t anniversary of love.

Step 209: within a second predefined reminder period, it is determined whether a current second page belongs to the predefined page set, and step 210 is proceeded to based on a determination result that the current second page belongs to the predefined page set; or step 209 is repeated based on a determination result that the current second page does not belong to the predefined page set.

As an example, at this point the predefined page set and the above predefined page set may be either same or different. The second predefined reminder period may also be one or more. For example, the second predefined period may be from 8 am to 12 am and from 13 pm to 22 pm.

Step 210: the first template display portal corresponding to the first predefined anniversary is displayed in the second page, and the second reminder information is displayed at the first template display portal.

The second reminder information may be used to remind the user that the current date is the first predefined anniversary, and remind the user to perform the editing operation with the editing template with respect to the first predefined anniversary.

Figure 5:
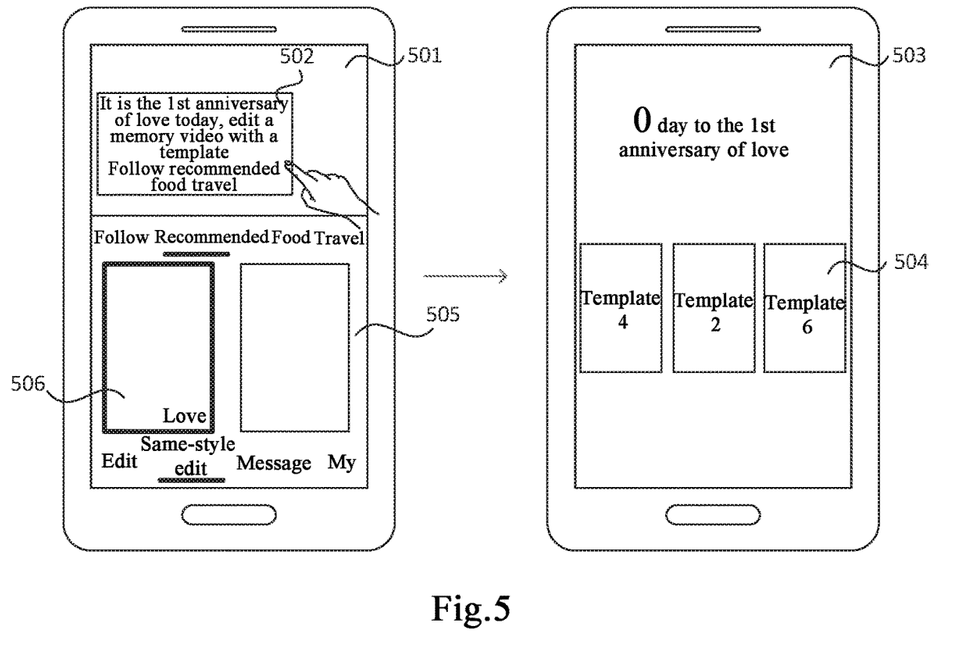
FIG. 5 is a schematic view of page interaction provided by an embodiment of the present disclosure.

FIG. 5 is a schematic view of page interaction provided by an embodiment of the present disclosure. Suppose the second page is a "same style editing" homepage 501, in which a first template display portal 502 is displayed and the second reminder information "it is $1^{st}$ anniversary of love today" and "edit a video using a template" is displayed.

In addition, as shown in FIG. 5, when a template recommendation stream display page 505 is embedded in the "same style editing" homepage 501, a third editing template 506 matching the first predefined anniversary may be displayed, an identification of the first predefined anniversary is displayed in the third editing template 506, such as "love" displayed in the third editing template 506, the third editing template 506 is displayed on top and is added with a highlighted border. Thus, it is possible to enrich the display way for editing templates corresponding to the predefined anniversary, reinforce the reminder effect and facilitate the user operation.

Step 211: a first triggering operation on the first template display portal is received, and a first predefined number of new first editing templates from a first template library corresponding to the first predefined anniversary is filtered out by using a first template filtering rule corresponding to the first predefined anniversary.

It is noteworthy that considering the factor of template heat, the filtering result at this point might be different from that in step 204. Of course, in response to determining that the last filtering is quite close to the current filtering, e.g., an interval of 12 hours, the filtering operation may also be omitted, and the first editing template may be determined directly based on the results of the last filtering.

Step 212: the anniversary editing template page is entered, and the new first editing templates are displayed in the anniversary editing template page.

As shown in FIG. 5, after the user clicks on the first template display portal 502, an anniversary editing template page 503 (which may be same as the anniversary editing template page 303) may be entered, and 3 first editing templates 504, i.e., template 4, template 2 and template 6 are displayed in the anniversary editing template page 503. It can be seen that the first editing template 504 and the first editing template 404 might be either same or different.

The method for multimedia resource editing scene provided by the embodiments of the present disclosure may support displaying corresponding editing templates in different ways at different stages of the predefined anniversary. If there is a long time to the predefined anniversary, the anniversary editing template page may be entered through the normalized second template display portal, and the first template display portal may be displayed in multiple pages within the predefined reminder period when the specified time is approaching or on the day of the specified time. Thus, the reminder is reinforced, and the convenience for entering the anniversary editing template page is improved. In addition, for different stages after entering the anniversary editing template page, editing templates to be displayed may be filtered out in different ways, so as to push editing templates more specifically and help users to select more suitable editing templates at different stages. Furthermore, the template recommendation stream display page may be reused for differentiated display of editing templates related to the specified time, e.g., sticky on top, which further improves the exposure rate of anniversary-related templates and the convenience of template selection.

Figure 6:
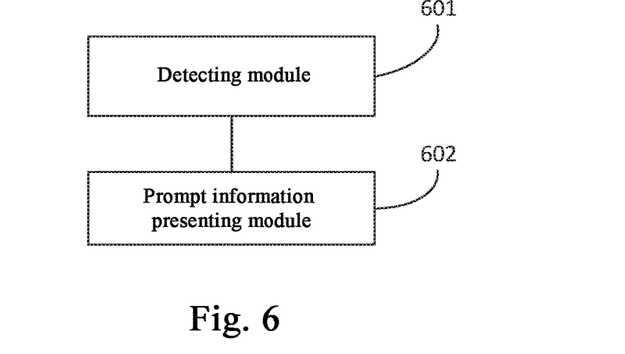
FIG. 6 is a structural block diagram of an apparatus for multimedia resource editing scene provided by an embodiment of the present disclosure.

FIG. 6 is a structural block diagram of an apparatus for multimedia resource editing scene provided by an embodiment of the present disclosure. The apparatus may be implemented as software and/or hardware, may be generally integrated in an electronic device and accomplish relevant functions in multimedia resource editing scene by performing a method for multimedia resource editing scene. As shown in FIG. 6, the apparatus comprises: a detecting module 601 and a prompt information presenting module 602.

The detecting module 601 is configured to detect whether a current time matches a specified time;

The prompt information presenting module 602 is configured to present prompt information of a target editing template in response to determining that the current time matches the specified time;

The target editing template is associated with a first multimedia resource; content of the first multimedia resource belongs to a content category associated with the specified time; the target editing template instructs to edit a to-be-edited multimedia material into a second multimedia resource according to a target editing way; the target editing way is an editing way used by the first multimedia resource; and the prompt information is presentation information of the first multimedia resource.

With the apparatus for multimedia resource editing scene provided in the embodiment of the present disclosure, when the current time matches the specified time, an editing template in the category corresponding to the specified time is recommended to the user, so that the user may be reminded to edit a video by using the related editing template at the specified time. Therefore, the interaction effects and the fun of video editing may be increased, the utilization efficiency of the editing template may be increased, the user activity level may be promoted, the traffic efficiency of application programs may be improved, and further the utilization efficiency of related resources such as the corresponding platform or server may be enhanced.

For example, the in response to determining that the current time matches the specified time comprises: determining a remaining time length for the current time to reach the specified time; in response to determining that the remaining time length is less than a first predefined time length threshold, determining that the current time matches the specified time.

For example, the prompt information displaying module comprises: a first portal displaying unit, configured to display a first template presentation portal corresponding to the specified time in response to determining that the current time matches the specified time; a first operation receiving unit, configured to receive a first triggering operation on the first template presentation portal; a first template presenting unit, configured to, in response to the first triggering operation, enter a predefined editing template page and present prompt information of a first predefined number of first editing templates in the predefined editing template page.

For example, the apparatus further comprises: in response to determining that the remaining time length is less than the first predefined time length threshold and greater than or equal to a second predefined time length threshold, display first reminder information at the first template presentation portal, the first reminder information reminding a user to perform at least one of: checking the remaining time length, or an obtaining operation for multimedia materials with respect to the specified time.

For example, the apparatus further comprises: a second reminder information displaying module, configured to display second reminder information at the first template presentation portal when the remaining time length is less than the second predefined time length threshold, the second reminder information reminding a user of at least one of: an arrival of the specified time, or performing an editing operation with an editing template with respect to the specified time.

For example, the first template presenting unit is configured to: in response to the first triggering operation, filter out a first predefined number of first target editing templates from a first template library corresponding to the specified time by using a first template filtering rule corresponding to the specified time; enter a predefined editing template page, and present the prompt information of the first target editing templates in the predefined editing template page.

For example, the first template filtering rule is determined according to at least one of: a predefined keyword, a predefined template tag, a predefined template category, and template heat.

For example, the apparatus further comprises: a second operation receiving unit, configured to, in response to determining that the current time does not match the specified time, receive a second triggering operation on a second template presentation portal corresponding to the specified time; a second template presenting unit, configured to, in response to the second triggering operation, filter out a second predefined number of second target editing templates from a second template library corresponding to the specified time by using a second template filtering rule corresponding to the specified time, where the second template filtering rule is different from the first template filtering rule; enter the predefined editing template page and present prompt information of the second target editing template in the predefined editing template page.

For example, the displaying prompt information of a target editing template comprises: present prompt information of a third target editing template in a template recommendation stream presentation page, and display an identification of the specified time at the prompt information of the third target editing template.

For example, a display page to which the first template presentation portal belongs comprises at least one of: a template editing function homepage, a template export page, an edited video processing page, a template search results page and a template details page.

For example, the apparatus may further comprises: a management portal displaying module, configured to display a specified time management portal; an operation receiving module, configured to enter a specified time management page in response to a third triggering operation to the specified time management portal; an anniversary management module, configured to generate and/or modify a corresponding specified time in response to a specified time setting operation inputted through the specified time management page.

For example, the management portal displaying module is configured to: display an anniversary management portal in response to determining that a current page is a display page to which the anniversary management portal belongs, and that an editing template corresponding to the current page matches an anniversary.

For example, the specified time comprises a user-specified periodic date.

For example, the apparatus may further comprise: an editing library page displaying module, configured to display an editing library page corresponding to a specified time, where the editing library page comprises at least one of: a multimedia resource obtained by being edited with an editing template corresponding to the specified time, or a multimedia material corresponding to the specified time.

Figure 7:
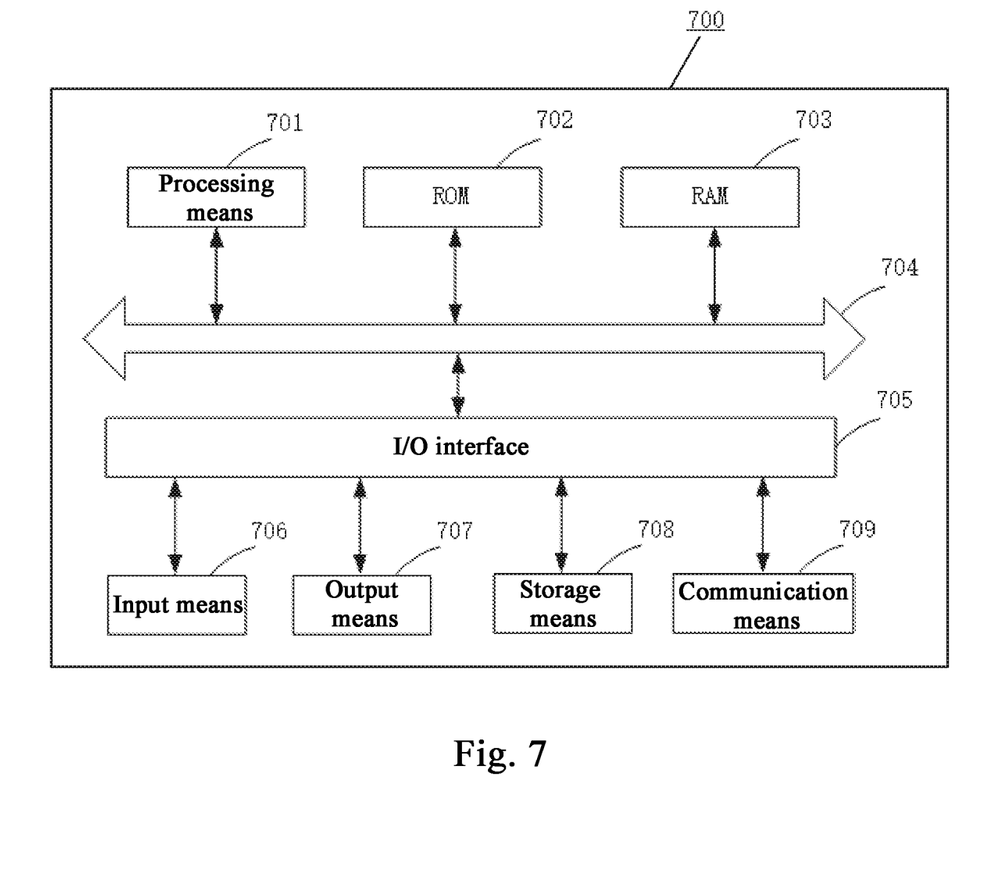
FIG. 7 is a structural block diagram of an electronic device provided by an embodiment of the present disclosure.

With reference to FIG. 7 below, the figure shows a schematic block diagram of an electronic device 700 suitable for implementing embodiments of the present disclosure. The electronic device in the embodiments of the present disclosure may include, without limitation to, a mobile terminal such as a mobile phone, a notebook computer, a digital broadcast receiver, PDA (personal digital assistant), PDA (tablet computer), PMP (portable multimedia player) and a vehicle terminal (e.g., a vehicle navigation terminal), and a fixed terminal such as a digital TV and a desktop computer. The electronic device shown in FIG. 7 is merely an example and not intended to limit the functionality and application scope of the embodiments of the present disclosure.

As shown in FIG. 7, the electronic device 700 may comprise processing means (e.g., a central processor, a graphics processor, etc.) 701 which is capable of performing various appropriate actions and processes in accordance with a program stored in a read only memory (ROM) 702 or a program loaded from storage means 708 to a random access memory (RAM) 703. In the RAM 703, there are also stored various programs and data required by the electronic device 700 when operating. The processing means 701, the ROM 702 and the RAM 703 are connected to one another via a bus 704. An input/output (I/O) interface 705 is also connected to the bus 704.

Usually, the following means are connected to the I/O interface 705: input means 706 including a touch screen, a touch tablet, a keyboard, a mouse, a camera, a microphone, an accelerometer, a gyroscope or the like; output means 707 including a liquid crystal display, a loudspeaker a vibrator or the like; storage means 708, including a magnetic tape, a hard disk or the like; and communication means 709. The communication means 709 allows the electronic device 700 to exchange information/data with other device in a wireless or wired way. Although FIG. 7 shows the electronic device 700 with various means, it should be understood that it does not require to implement or have all the shown means. Alternatively, more or less means may be implemented or comprised.

In particular, the procedures described with reference to the flowchart according to the embodiments of the present disclosure may be implemented as a computer software program. For example, the embodiments of the present disclosure comprise a computer program product, which comprises a computer program carried on a non-transient computer readable medium, the computer program containing program code for performing the method shown in the flowchart. In such an embodiment, the computer program may be downloaded from the network and installed via the communication means 709, or installed from the storage means 708, or installed from the ROM 702. The computer program, when executed by the processing means 701, may execute the above functions defined in the method according to the embodiments of the present disclosure.

It is noteworthy that the computer readable medium can be a computer readable signal medium or a computer readable storage medium or any combination thereof. The computer readable storage medium may be, for example, but is not limited to, an electronic, magnetic, optical, electromagnetic, infrared, semiconductor system, means or device, or any suitable combination of the foregoing. More specific examples of the computer readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction there-with. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

The above computer readable medium may be included in the above-mentioned electronic device; and it may also exist alone without being assembled into the electronic device.

The computer readable medium carries one or more programs which, when executed by the electronic device, cause the electronic device to: detect that a reminder event for a specified time is triggered; present in a predefined page an editing template that matches the specified time, wherein the editing template is used to obtain an edited video by editing multimedia materials.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware. Wherein the name of a module does not form any limitation to the module per se. For example, the detecting module may further be described as a "module detecting whether a current time matches a specified time."

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, means or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

According to one or more embodiments of the present disclosure, Example 1 provides a method for multimedia resource editing scene, comprising: detecting whether a current time matches a specified time; presenting prompt information of a target editing template in response to determining that the current time matches the specified time; where the target editing template is associated with a first multimedia resource; content of the first multimedia resource belongs to a content category associated with the specified time; the target editing template instructs to edit a to-be-edited multimedia material into a second multimedia resource in a target editing way; the target editing way is an editing way used by the first multimedia resource; and the prompt information is presentation information of the first multimedia resource.

According to one or more embodiments of the present disclosure, in Example 2 of the method as described in Example 1: the determining that the current time matches the specified time comprises: determining a remaining time length for the current time to reach the specified time; and in response to determining that the remaining time length is less than a first predefined time length threshold, determining that the current time matches the specified time.

According to one or more embodiments of the present disclosure, in Example 3 of the method as described in Example 2, the presenting prompt information of a target editing template comprises: displaying a first template presentation portal corresponding to the specified time; receiving a first triggering operation on the first template presentation portal; and in response to the first triggering operation, entering a predefined editing template page and presenting prompt information of a first predefined number of first editing templates in the predefined editing template page.

According to one or more embodiments of the present disclosure, in Example 4 of the method as described in Example 3, the method further comprises: in response to determining that the remaining time length is less than the first predefined time length threshold and greater than or equal to a second predefined time length threshold, displaying first reminder information at the first template presentation portal, the first reminder information reminding a user to perform at least one of: checking the remaining time length, or an obtaining operation for multimedia materials with respect to the specified time.

According to one or more embodiments of the present disclosure, in Example 5 of the method as described in Example 4, the method further comprises: in response to determining that the remaining time length is less than the second predefined time length threshold, displaying second reminder information at the first template presentation portal, the second reminder information reminding a user of at least one of: an arrival of the specified time, or performing an editing operation with an editing template with respect to the specified time.

According to one or more embodiments of the present disclosure, in Example 6 of the method as described in Example 3, the in response to the first triggering operation, entering a predefined editing template page in response to the first triggering operation and presenting prompt information of a first predefined number of first target editing templates in the predefined editing template page comprises: in response to the first triggering operation, filtering out a first predefined number of first target editing templates from a first template library corresponding to the specified time by using a first template filtering rule corresponding to the specified time; and entering a predefined editing template page, and the present prompt information of the first target editing template in the predefined editing template page.

According to one or more embodiments of the present disclosure, in Example 7 of the method as described in Example 6, the first template filtering rule is determined according to at least one of a predefined keyword, a predefined template tag, a predefined template category, or template heat.

According to one or more embodiments of the present disclosure, in Example 8 of the method as described in Example 6, the method further comprises: in response to determining that the current time does not match the specified time, receiving a second triggering operation on a second template presentation portal corresponding to the specified time; in response to the second triggering operation, filtering out a second predefined number of second target editing templates from a second template library corresponding to the specified time by using a second template filtering rule corresponding to the specified time, wherein the second template filtering rule is different from the first template filtering rule; and entering the predefined editing template page and presenting prompt information of the second target editing template in the predefined editing template page.

According to one or more embodiments of the present disclosure, in Example 9 of the method as described in Example 1, the presenting prompt information of a target editing template comprises: presenting prompt information of a third target editing template in a template recommendation stream presentation page, and displaying an identification of the specified time at the prompt information of the third target editing template.

According to one or more embodiments of the present disclosure, in Example 10 of the method as described in Example 1, the method further comprises: displaying a specified time management portal; in response to a third triggering operation to the specified time management portal, entering a specified time management page; and in response to a specified time setting operation inputted through the specified time management page, performing at least one of: generating a corresponding specified time, or modifying a corresponding specified time.

According to one or more embodiments of the present disclosure, in Example 11 of the method as described in Example 10, the displaying a specified time management portal comprises: displaying the specified time management portal, in response to determining that a current page is a display page to which the specified time management portal belongs and an editing template corresponding to the current page matches the specified time.

According to one or more embodiments of the present disclosure, in Example 12 of the method as described in any of Examples 1 to 11, the specified time comprises a user-specified periodic date.

According to one or more embodiments of the present disclosure, in Example 13 of the method as described in any of Examples 1 to 11, the method further comprises: displaying an editing library page corresponding to the specified time, wherein the editing library page comprises at least one of: a multimedia resource obtained by being edited with an editing template corresponding to the specified time, or a multimedia material corresponding to the specified time.

According to one or more embodiments of the present disclosure, Example 14 provides an apparatus for multimedia resource editing scene, comprising: a detecting module, configured to detect whether a current time matches a specified time; a prompt information presenting module, configured to present prompt information of a target editing template in response to determining that the current time matches the specified time; where the target editing template is associated with a first multimedia resource; content of the first multimedia resource belongs to a content category associated with the specified time; the target editing template instructs to edit a to-be-edited multimedia material into a second multimedia resource in a target editing way; the target editing way is an editing way used by the first multimedia resource; and the prompt information is presentation information of the first multimedia resource.

According to one or more embodiments of the present disclosure, Example 15 provides an electronic device, comprising a memory, a processor and a computer program stored in the memory and runnable on the processor, the processor, when executing the computer program, performing the method according to any of Examples 1 to 13.

According to one or more embodiments of the present disclosure, Example 16 provides a computer readable storage medium, storing a computer program thereon, the computer program, when executed by a processor, performing the method according to any of Examples 1 to 13.

The foregoing description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous.

Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

We claim:

1. A method for multimedia resource editing scene, comprising:
   detecting whether a current time matches a specified time;
   determining that the current time matches the specified time in response to determining that a remaining time length for the current time to reach the specified time is less than a first predefined time length threshold;
   presenting prompt information of a target editing template in response to determining that the current time matches the specified time;
   wherein the target editing template is associated with a first multimedia resource; content of the first multimedia resource belongs to a content category associated with the specified time; the target editing template instructs to edit a to-be-edited multimedia material into a second multimedia resource in a target editing way; the target editing way is an editing way used by the first multimedia resource; and the prompt information is presentation information of the first multimedia resource; and
   wherein the method further comprises:
   in response to determining that the remaining time length is less than the first predefined time length threshold and greater than or equal to a second predefined time length threshold, displaying first reminder information at a first template presentation portal, the first reminder information reminding a user to perform at least one of checking the remaining time length or an operation of obtaining multimedia materials with respect to the specified time.

2. The method according to claim 1, wherein the presenting prompt information of a target editing template comprises:
   displaying the first template presentation portal corresponding to the specified time;
   receiving a first triggering operation on the first template presentation portal; and
   in response to the first triggering operation, entering a predefined editing template page and presenting prompt information of a first predefined number of first editing templates in the predefined editing template page.

3. The method according to claim 2, wherein the in response to the first triggering operation, entering a predefined editing template page and presenting prompt information of a first predefined number of first target editing templates in the predefined editing template page comprises:
   in response to the first triggering operation, filtering out a first predefined number of first target editing templates from a first template library corresponding to the specified time by using a first template filtering rule corresponding to the specified time; and
   entering a predefined editing template page, and presenting the prompt information of the first target editing templates in the predefined editing template page.

4. The method according to claim 3, wherein the first template filtering rule is determined according to at least one of: a predefined keyword, a predefined template tag, a predefined template category, or template heat.

5. The method according to claim 3, further comprising:
   in response to determining that the current time does not match the specified time, receiving a second triggering operation on a second template presentation portal corresponding to the specified time;
   in response to the second triggering operation, filtering out a second predefined number of second target editing templates from a second template library corresponding to the specified time by using a second template filtering rule corresponding to the specified time, wherein the second template filtering rule is different from the first template filtering rule; and
   entering the predefined editing template page and presenting prompt information of the second target editing templates in the predefined editing template page.

6. The method according to claim 1, further comprising:
   in response to determining that the remaining time length is less than the second predefined time length threshold, displaying second reminder information at the first template presentation portal, the second reminder information reminding a user of at least one of: an arrival of the specified time, or performing an editing operation with an editing template with respect to the specified time.

7. The method according to claim 1, wherein the presenting prompt information of a target editing template comprises:
   presenting prompt information of a third target editing template in a template recommendation stream presentation page, and displaying an identification of the specified time at the prompt information of the third target editing template.

8. The method according to claim 1, further comprising:
   displaying a specified time management portal;
   in response to a third triggering operation to the specified time management portal, entering a specified time management page; and
   in response to a specified time setting operation inputted through the specified time management page, performing at least one of: generating a corresponding specified time, or modifying a corresponding specified time.

9. The method according to claim 8, wherein the displaying a specified time management portal comprises:
   displaying the specified time management portal, in response to determining that a current page is a display page to which the specified time management portal belongs and an editing template corresponding to the current page matches the specified time.

10. The method according to claim 1, wherein the specified time comprises a user-specified periodic date.

11. The method according to claim 1, further comprising:
    displaying an editing library page corresponding to the specified time, wherein the editing library page comprises at least one of: a multimedia resource obtained by being edited with an editing template corresponding to the specified time, or a multimedia material corresponding to the specified time.

12. An electronic device, comprising a memory, a processor and a computer program stored on the memory and runnable on the processor, the processor, when executing the computer program, being configured to:
    detect whether a current time matches a specified time;
    determine that the current time matches the specified time in response to determining that a remaining time length for the current time to reach the specified time is less than a first predefined time length threshold;

present prompt information of a target editing template in response to determining that the current time matches the specified time;

wherein the target editing template is associated with a first multimedia resource; content of the first multimedia resource belongs to a content category associated with the specified time; the target editing template instructs to edit a to-be-edited multimedia material into a second multimedia resource in a target editing way; the target editing way is an editing way used by the first multimedia resource; and the prompt information is presentation information of the first multimedia resource; and wherein the processor is further configured to:

in response to determining that the remaining time length is less than the first predefined time length threshold and greater than or equal to a second predefined time length threshold, display first reminder information at a first template presentation portal, the first reminder information reminding a user to perform at least one of checking the remaining time length or an operation of obtaining multimedia materials with respect to the specified time.

13. The electronic device according to claim 12, wherein the processor is configured to present prompt information of a target editing template in the following manner:

displaying the first template presentation portal corresponding to the specified time;

receiving a first triggering operation on the first template presentation portal; and in response to the first triggering operation, entering a predefined editing template page and presenting prompt information of a first predefined number of first editing templates in the predefined editing template page.

14. The electronic device according to claim 13, wherein the in response to the first triggering operation, entering a predefined editing template page and presenting prompt information of a first predefined number of first target editing templates in the predefined editing template page comprises:

in response to the first triggering operation, filtering out a first predefined number of first target editing templates from a first template library corresponding to the specified time by using a first template filtering rule corresponding to the specified time; and entering a predefined editing template page, and presenting the prompt information of the first target editing templates in the predefined editing template page.

15. The electronic device according to claim 12, wherein the processor is further configured to:

in response to determining that the remaining time length is less than the second predefined time length threshold, display second reminder information at the first template presentation portal, the second reminder information reminding a user of at least one of: an arrival of the specified time, or performing an editing operation with an editing template with respect to the specified time.

16. A non-transient computer readable storage medium, storing a computer program thereon, the computer program, when executed by a processor, causes the processor to perform operations comprising:

detecting whether a current time matches a specified time;

determining that the current time matches the specified time in response to determining that a remaining time length for the current time to reach the specified time is less than a first predefined time length threshold;

presenting prompt information of a target editing template in response to determining that the current time matches the specified time;

wherein the target editing template is associated with a first multimedia resource; content of the first multimedia resource belongs to a content category associated with the specified time; the target editing template instructs to edit a to-be-edited multimedia material into a second multimedia resource in a target editing way; the target editing way is an editing way used by the first multimedia resource; and the prompt information is presentation information of the first multimedia resource; and wherein the operations further comprise:

in response to determining that the remaining time length is less than the first predefined time length threshold and greater than or equal to a second predefined time length threshold, displaying first reminder information at a first template presentation portal, the first reminder information reminding a user to perform at least one of checking the remaining time length or an operation of obtaining multimedia materials with respect to the specified time.

17. The non-transient computer readable storage medium according to claim 16, the operations further comprising:

displaying the first template presentation portal corresponding to the specified time;

receiving a first triggering operation on the first template presentation portal; and in response to the first triggering operation, entering a predefined editing template page and presenting prompt information of a first predefined number of first editing templates in the predefined editing template page.

18. The non-transient computer readable storage medium according to claim 16, the operations further comprising:

in response to determining that the remaining time length is less than the second predefined time length threshold, displaying second reminder information at the first template presentation portal, the second reminder information reminding a user of at least one of an arrival of the specified time or performing an editing operation with an editing template with respect to the specified time.

19. The non-transient computer readable storage medium according to claim 16, the operations further comprising:

presenting prompt information of a third target editing template in a template recommendation stream presentation page; and displaying an identification of the specified time at the prompt information of the third target editing template.

20. The non-transient computer readable storage medium according to claim 16, the operations further comprising:

displaying a specified time management portal;

in response to a third triggering operation to the specified time management portal, entering a specified time management page; and in response to a specified time setting operation inputted through the specified time management page, performing at least one of: generating a corresponding specified time, or modifying a corresponding specified time.

* * * * *